United States Patent
Lin et al.

(10) Patent No.: US 8,938,535 B2
(45) Date of Patent: Jan. 20, 2015

(54) SYSTEM FOR REAL TRAFFIC REPLAY OVER WIRELESS NETWORKS

(75) Inventors: Ying-Dar Lin, Hsinchu (TW); Chia-Yu Ku, Hsinchu (TW); Pei-Hsuan Li, Hsinchu (TW); Yuan-Cheng Lai, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 246 days.

(21) Appl. No.: 13/486,556

(22) Filed: Jun. 1, 2012

(65) Prior Publication Data
US 2013/0326052 A1    Dec. 5, 2013

(51) Int. Cl.
*G06F 15/173*    (2006.01)

(52) U.S. Cl.
USPC ........................... 709/224; 709/223; 709/225

(58) Field of Classification Search
USPC .............. 709/223, 224, 238, 201–203, 232; 370/394, 252
See application file for complete search history.

(56) References Cited

U.S. PATENT DOCUMENTS

| | | | |
|---|---|---|---|
| 6,384,739 B1 | 5/2002 | Roberts, Jr. | |
| 6,507,604 B1 | 1/2003 | Kuo | |
| 7,203,173 B2 | 4/2007 | Bonney et al. | |
| 7,349,670 B2 | 3/2008 | Mlinarsky et al. | |
| 7,366,647 B2* | 4/2008 | Araya et al. | 703/14 |
| 7,890,821 B2 | 2/2011 | Music et al. | |
| 7,921,333 B2 | 4/2011 | Smith et al. | |
| 7,953,092 B2 | 5/2011 | Pepper et al. | |
| 7,965,726 B2* | 6/2011 | Wei et al. | 370/412 |
| 7,970,407 B2* | 6/2011 | Vincent | 455/446 |
| 8,135,339 B2* | 3/2012 | Ranson et al. | 455/24 |
| 8,484,002 B2* | 7/2013 | Yang et al. | 703/8 |
| 8,505,098 B2* | 8/2013 | Lin et al. | 726/24 |
| 8,578,493 B1* | 11/2013 | Cowan et al. | 726/23 |
| 8,607,229 B2* | 12/2013 | Malloy et al. | 718/1 |
| 2002/0066082 A1* | 5/2002 | Araya et al. | 717/135 |
| 2002/0198694 A1* | 12/2002 | Yang et al. | 703/6 |
| 2003/0083847 A1* | 5/2003 | Schertz et al. | 702/186 |
| 2003/0084318 A1* | 5/2003 | Schertz | 713/200 |
| 2003/0084340 A1* | 5/2003 | Schertz et al. | 713/201 |
| 2006/0209866 A1 | 9/2006 | Steenkiste et al. | |
| 2006/0227796 A1* | 10/2006 | Wei et al. | 370/412 |
| 2007/0093997 A1* | 4/2007 | Yang et al. | 703/8 |
| 2008/0120081 A1* | 5/2008 | Chandrashekar et al. | 703/13 |
| 2010/0167639 A1* | 7/2010 | Ranson et al. | 455/24 |
| 2010/0292971 A1* | 11/2010 | Sachse | 703/6 |
| 2012/0005754 A1* | 1/2012 | Lin et al. | 726/24 |

OTHER PUBLICATIONS

Li et al., "Real Traffic Replay over WLAN with Environment Emulation", A Thesis Sumbitted to Institute of Computer Science and Engineering, College of Computer Science, National Chiao Tung University, pp. 1-26 (Published Jun. 3, 2011).

* cited by examiner

*Primary Examiner* — Sargon Nano
(74) *Attorney, Agent, or Firm* — Edwards Wildman Palmer LLP; Peter F. Corless; Steven M. Jensen (57) ABSTRACT

A real traffic replay over wireless networks with environment emulation and an event-driven automata-synchronized replay method are disclosed. The system includes a first traffic capture module configured to capture packet traces and environment effects in a real environment, a first event transform module configured to transform the packet traces into a sequence of events, and a reproduce module configured to receive the environment effects from the first traffic capture module and the sequence of events from the first event transform module such as to control a replay of the environment effects in the real environment and the sequence of events coordinately by means of automata.

17 Claims, 9 Drawing Sheets

FIG.1B (b) Lack of environment emulation

FIG.1A (a) Lack of packet replay control

FIG. 5F (f) Deffered PS-poll Rsp.

FIG. 5E (e) Immediate PS-poll Rsp.

FIG. 5D (d) Directed MSDU/MMPDU

FIG. 6

FIG. 7 even though the environment effects could be reproduced, poor coordination between the packet-replay control and environment emulation may result in inconsistent environment effects to packets. As a result, to apply real traffic replay in wireless networks requires not only packet-replay control but also environment emulation coordinately.

SYSTEM FOR REAL TRAFFIC REPLAY OVER WIRELESS NETWORKS

BACKGROUND OF THE INVENTION

1. Field of the Invention

This invention relates to wireless local area networks (wireless networks), and, more particularly, to a system for real traffic replay over wireless networks.

2. Description of Related Art

Real traffic replay is highly applied in wired networks over the last decade. The packet exchanges with the device under test (DUT) should be precisely controlled following the protocol specification. However, traffic replay in wireless networks suffers further challenges due to variant wireless environments. Because a wireless medium is open and shared, transmissions may suffer packet errors caused by fading, noise, and interference. Therefore, traffic behaviors could be disturbed by environment effects. Even though the environment effects could be reproduced, poor coordination between the packet-replay control and environment emulation may result in inconsistent environment effects to packets. As a result, to apply real traffic replay in wireless networks requires not only packet-replay control but also environment emulation coordinately.

Compared to the packet traces record in the real environment, the reproduced traffic may suffer false negative (FN) and false positive (FP). FN indicates a successful packet exchange in the real environment fails in traffic replay. On the contrary, FP indicates a failed packet exchange in the real environment succeeds in traffic replay. Lack of packet-replay control, or environment emulation, or coordination between them may result in FN and FP cases.

Figure 1A:
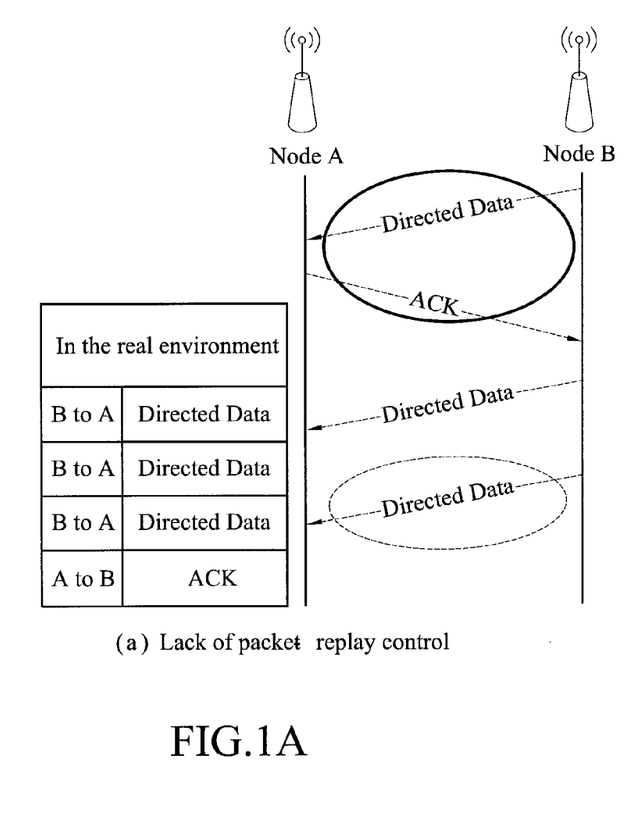
FIGS. 1A-1C are block diagrams of examples of false negative and false positive cases in real traffic replay.
Figure 1B:
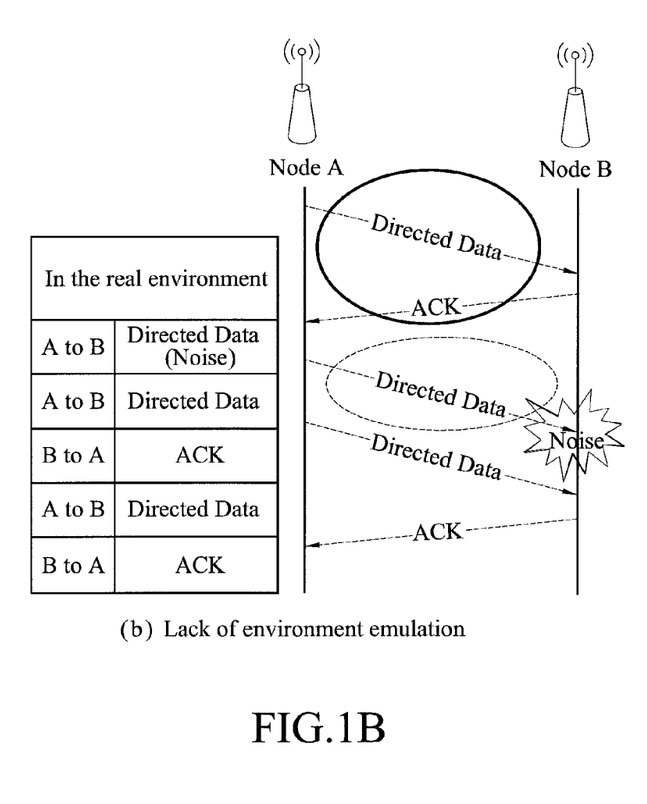
Figure 1C:
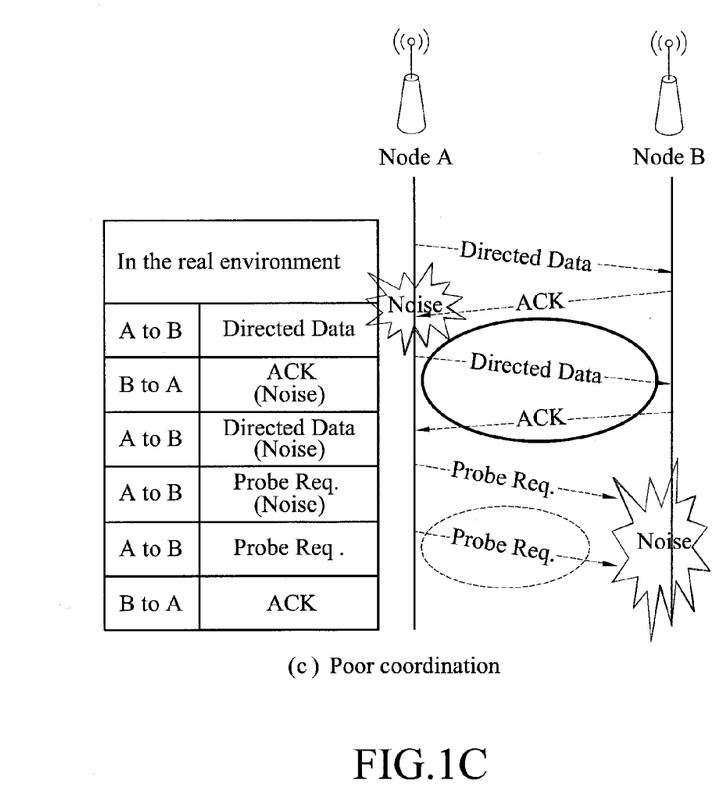

In FIG. 1A, due to loss of packet-replay control, the ACK from Node A to Node B is transmitted in advance. The first and third Directed Data suffer FP and FN, respectively. Transmissions in wireless networks are prone to bit errors due to variant environments. In FIG. 1B, the first Directed Data intends to suffer FP because the noise disturbing the first Directed Data is not reproduced and the packet error rate decreases. In contrast, the second Directed Data encounters the unexpected noise due to lack of environment emulation. The FN case might occur. Even though the packet-replay control and environment emulation is applied, the poor coordination between them can also result in FN or FP cases. FIG. 1C shows that the reproduced noise with an uncontrolled duration could lead the second Directed Data to the FP case and the second Probe Req. to the FN case.

The above examples illustrate that lack of packet-replay control or environment emulation may highly affect the traffic behaviors. Therefore, both of the packet-replay control and environment emulation should be reproduced coordinately.

SUMMARY OF THE INVENTION

The present invention discloses a system for real traffic replay in wireless networks, the system comprises a first traffic capture module configured to capture packet traces and environment effects in a real environment and export the packet traces and environment effects; a first event transform module configured to receive the packet traces from the first traffic capture module and transform the packet traces into a sequence of events as well as export the sequence of events; and a reproduce module configured to receive the environment effects from the first traffic capture module and the sequence of events from the first event transform module such as to control a replay of the environment effects in the real environment and the sequence of events coordinately by means of automata.

In addition, The system further comprises a second traffic capture module configured to capture a replayed packet traces from the reproduce module in a traffic replay environment and export the replayed packet traces; a second event transform module configured to receive the replayed packet traces from and the second traffic capture module and transform the replayed packet traces into a sequence of replayed events as well as export the sequence of replayed events; and a ratio calculation module configured to receive the sequence of events from the first event transform module and the sequence of replayed events from the second event transform module and compare thereof so as to calculate a reproduction ratio.

Moreover, the system further comprises a benchmarking module configured to provide the sequence of replayed events from the second event transform module for different devices under test to benchmark the acclimatization of the different device under test.

The first event transform module described above transforms the packet traces into the sequence of events following protocol, and the second event transform module described above transforms the replayed packet traces into the sequence of replayed events following the protocol. And in an embodiment, the first traffic capture module includes a plurality of monitors deposed in the real environment to record the packet traces between a station and an access point. The station and the access point play the role of a transmitter and a receiver in turn. The first traffic capture module determines weights of the monitors based on the signal amplitudes of packets received by the monitors, and determines whether the receiver has received the packets according to the weights of the monitors.

Consequently, the system for real traffic replay in wireless networks of this present invention defines a sequence of events following protocol (e.g. IEEE 802.11) to describe traffic behaviors, and applies automata to control a replay of the environment effects in the real environment and the sequence of events. Based on these events, this present invention defines the reproduction ratio to quantify the approximation level of the traffic replay environment to the real environment.

BRIEF DESCRIPTION OF THE DRAWINGS

The invention will be more readily understood in view of the following description when accompanied by the below figures, wherein like reference numerals represent like elements.

DETAILED DESCRIPTION

Figure 2:
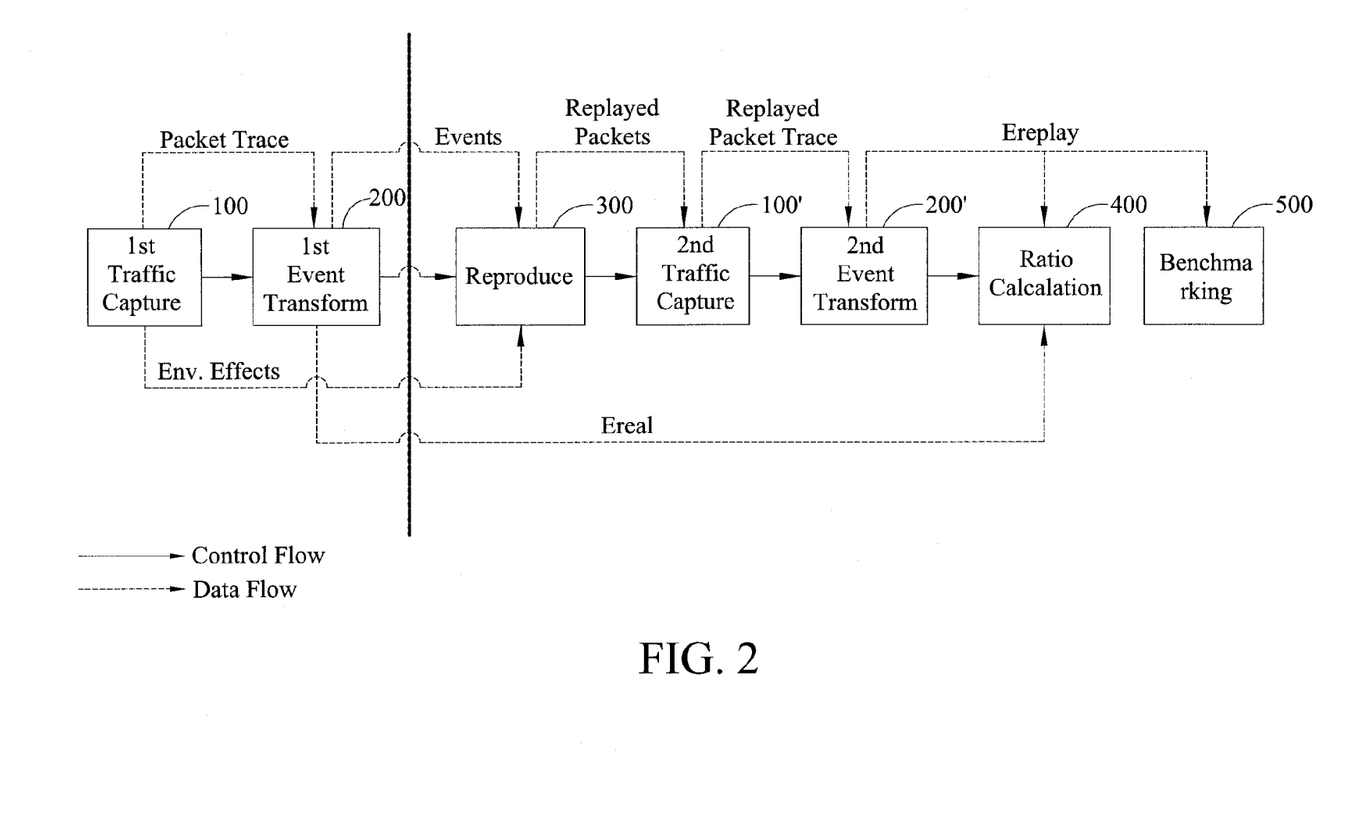
FIG. 2 is a block diagram according to the present invention.

Please refer to FIG. 2, which illustrates an embodiment of a system for real traffic replay in wireless networks. The system comprises a first traffic capture module 100, a first event transform module 200, and a reproduce module 300.

The first traffic capture module 100 may be configured to capture packet traces and environment effects in a real environment. The first traffic capture module 100 transmits the packet traces to the first event transform module 200 and transmits the environment effects to the reproduce module 300.

The first event transform module 200 may be configured to receive the packet traces from the first traffic capture module 100 and transform the packet traces into a sequence of events. The first event transform module 200 transmits the sequence of events to the reproduce module 300. The first event transform module 200 transforms the packet traces into the sequence of events following protocol (e.g., IEEE 802.11). Furthermore, the first event transform module 200 still transmits the sequence of events (Ereal) to a ratio calculation module 400 (to be described later).

The reproduce module 300 may be configured to receive the environment effects from the first traffic capture module 100 and the sequence of events from the first event transform module 200.

Thus, the reproduce module 300 may integrate the environment effects and the sequence of events as well as control a replay of the environment effects by means of automata, wherein the reproduce module 300 replays the sequence of events transformed by the packet traces captured from a transmitter and replays the environment effect captured from a receiver in the real environment. The reproduce module 300 classifies the sequence of events by means of the automata prior to controlling the replay.

In an embodiment, the system may further comprise a second traffic capture module 100', a second event transform module 200' and a ratio calculation module 400.

The second traffic capture module 100' may be configured to capture a replayed packet traces from the reproduce module 300 in a traffic replay environment. The second traffic capture module 100' also transmits the replayed packet traces to the second event transform module.

The second event transform module 200' may be configured to receive the replayed packet traces from the second traffic capture module 100' and transform the replayed packet traces into a sequence of replayed events following protocol (e.g., IEEE 802.11). The second event transform module 200' may also transmit the sequence of replayed events (Ereplay) to the ratio calculation module 400. In addition, the second event transform module 200' may transmit the Ereplay to a benchmarking module 500.

The ratio calculation module 400 may be configured to receive the sequence of events from the first event transform module 200 and the sequence of replayed events from the second event transform module 200'. The ratio calculation module 400 may compare the sequence of events and the sequence of replayed events so as to calculate a reproduction ratio to quantify the approximation level of the traffic replay environment to the real environment.

The benchmarking module 500 may be configured to provide the sequence of replayed events from the second event transform module 200' for different UDTs to benchmark the performance of the different UDTs in an environment of the sequence of replayed events.

Figure 3:
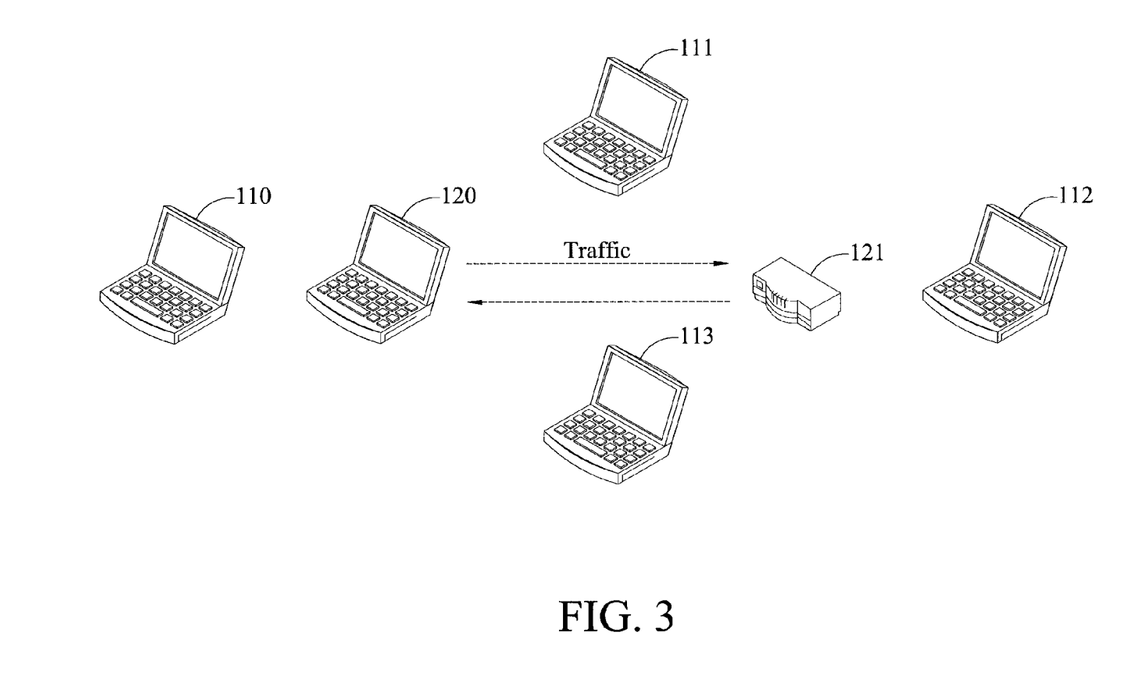
FIG. 3 is a block diagram of a multi-point device in a real environment according to an embodiment of the present invention.

Refer to FIG. 3. The first traffic capture module 100 may employ the multi-node capture technology to capture packets in a real environment. The first traffic capture module 100 may include a plurality of monitors 110, 111, 112 and 113 deposed in the real environment to record the packet traces between a station 120 and an access point 121. The station 120 and the access point 121 play the role of a transmitter and a receiver in turn. Weights of the plurality of monitors 110, 111, 112 and 113 can be determined based on the signal amplitude of packet traces recorded by the plurality of monitors, and whether the receiver has received the packet traces can be determined according to the weights of the plurality of monitors 110, 111, 112 and 113. In other words, a weight calculating method takes the weights of the monitors into consideration with respect to the same packet. For example, if the monitors 110, 112, 113 and 114 have weights equal to 0.2, 0.4, 0.2 and 0.2, respectively, and only the monitors 110, 113 and 114 have recorded the packets, the receiver is determined to have received the packet since 0.2+0.2+0.2=0.6, which is greater than or equal to 0.5.

Figure 4:
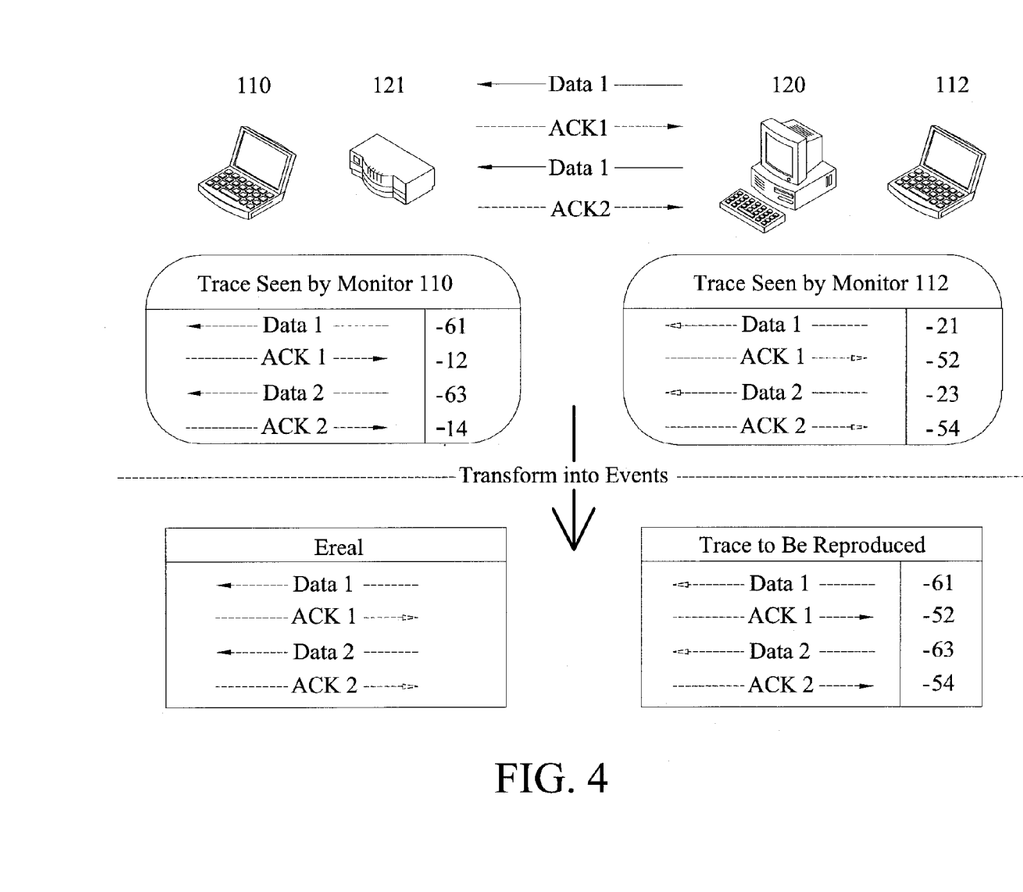
FIG. 4 is a block diagram of an example of generating $E_{Real}$ and traces to be reproduced.

Refer to FIG. 4, which illustrates an example of generating Ereal and packet traces to be reproduced.

Because of variant wireless environments, the packet traces and environment effects seen by the transmitter and receiver could be different. The transmitter-side cannot see the environment effect of each packet caused by the wireless channel. On the other hand, a portion of the receiver-side packets may be corrupted. Therefore, the reproduce module 300 reproduces the transmitter-side packets (i.e., replays the sequence of events transformed by the packet traces captured from the first traffic capture module 100) with the receiver-side environment effects to the DUT (device under test). On the contrary, Ereal and Ereplay are extracted from the receiver-side packets. Considering bidirectional transmissions, a station (STA) 120 and an access point (AP) 121 play the role of transmitter and receiver in turn.

Ereal can be extracted from the receiver-side packets that are composed of the black left arrows at monitor 110 and white right arrows at the monitor 112. On the other hand, the packet traces to be reproduced consists of the transmitter-side packets and receiver-side environment effects. Note that the transmitter-side packets consist of the black right arrows at monitor 110 and white left arrows at the monitor 112. The receiver-side environment effects are −52 and −54 dBm for the black right arrows, and −61 and −63 dBm for the white left arrows, respectively.

The automata are shown in FIGS. 5A to 5F. The reproduce module 300 may classify the sequence of events by means of the automata, and than integrate the environment effects from the first traffic capture module 100 and the sequence of events from the first event transform module 200 coordinately by means of the automata, and further control a replay of the environment effects in the real environment and the sequence of events coordinately by means of automata. And to keep correct interactions with the DUT, the reproduce module 300 applies the three-level automata, such as level-0, level-1 and level-2, to control the replay, wherein the level-1 automaton deals with events that allow an interruption between a request and a response, and the level-2 automaton deals with events that do not allow an interruption between a request and a response.

Figure 5A:
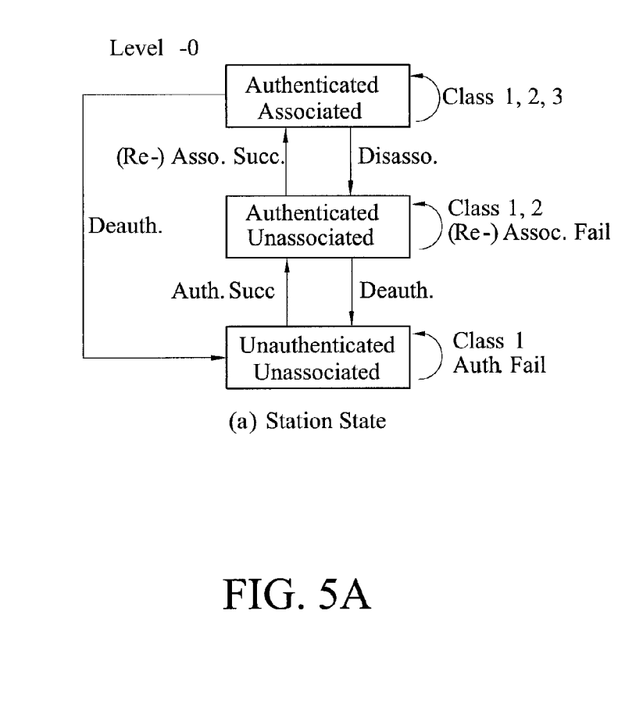
FIGS. 5A-5F are block diagrams of a three level automata according to an embodiment of the present invention.

FIG. 5A depicts the level-0 automaton that maintains the station states for a STA 120 and exists at both the STA 120 and AP 121. The valid packets in each state are classified into Class 1, 2, and 3 according to the Authentication and Association statuses. To make all the reproduced packets acceptable to the DUT (refers to AP 121 herein), the reproduce module 300 keeps the same station state as the state in the real environment. If unexpected behaviors of the DUT triggered state transition, the reproduce module 300 would apply the Authentication or Association procedure to transit to a correct state. For example, when the DUT send a De-authentication or a Disassociation, the reproduce module 300 is aware of the change of station states. Then the reproduce module 300 would originate an Authentication or Association procedure to the DUT to return to the original state.

Figure 5B:
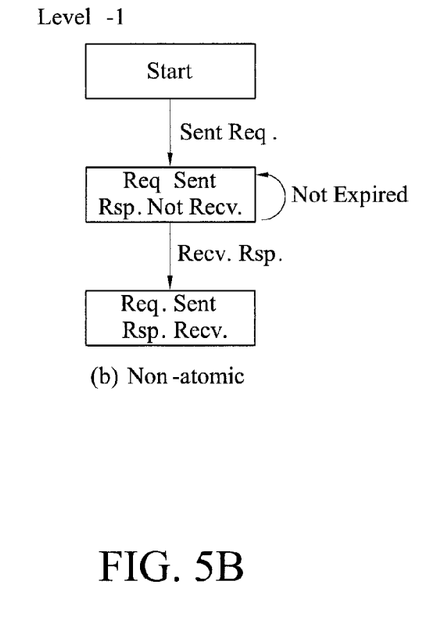
Figure 5C:
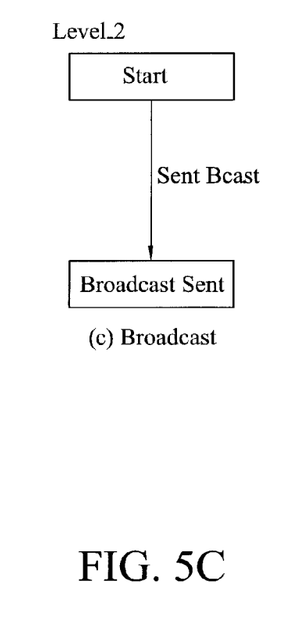
Figure 5D:
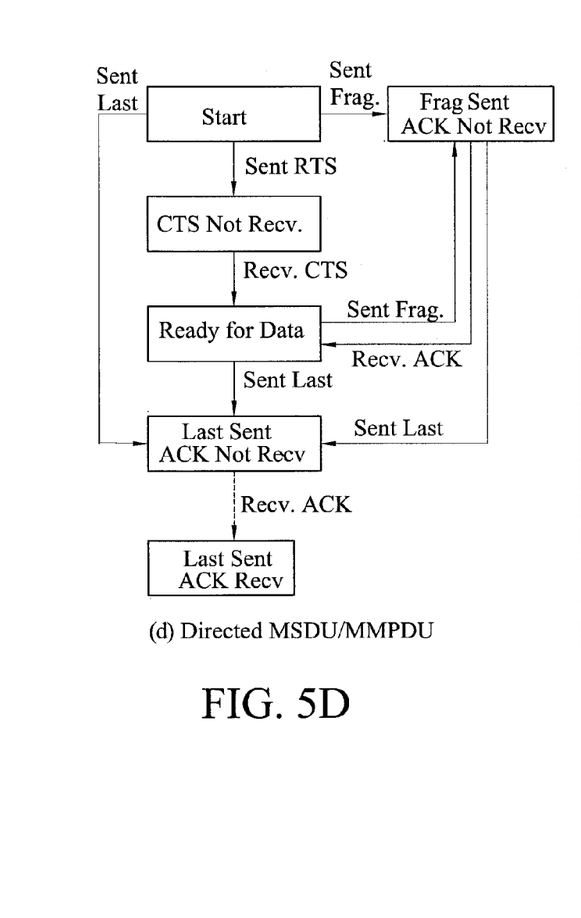
Figure 5E:
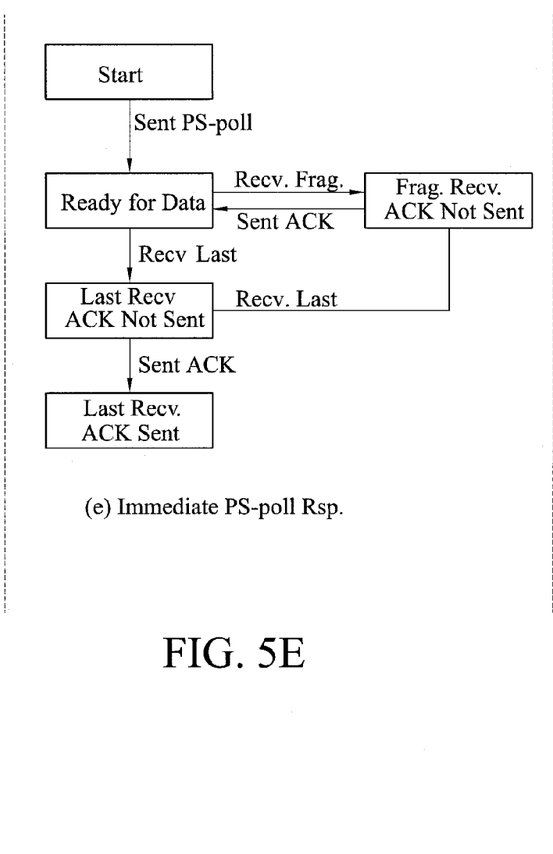
Figure 5F:
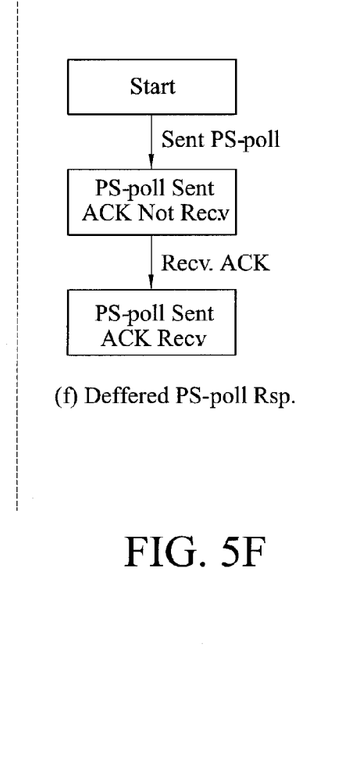

The level-2 automata address the atomic events that should not be interrupted by the other events. Atomic events can be mapped to the basic operation sequence defined in IEEE 802.11. The state transitions of the level-2 automata are triggered by only packet exchanges. In FIG. 5, except the Broadcast automaton that does not interact with the DUT, the other level-2 automata should transmit a captured packet after the previous packet has been received from the DUT. The Directed MSDU or MMPDU automaton addresses the unicast data or management frames. The Immediate PS-poll Rsp. and Deferred PS-poll Rsp. automata handle retrieving the buffered data during the power-saving mode. Note that Frag. denotes a fragment of data whereas Last indicates the last fragment of data.

The level-1 automaton deals with non-atomic events that allow other events occur between the request and response. The state transitions of the level-1 automata are triggered by atomic events. For example, after sending the Association Request, the reproduce module 300 also allows redundant Probe Requests and Responses before receiving the Association Response from the DUT. The association procedure still completes. Table 1 summarizes the relationship among the automata and events.

TABLE 1

RELATIONSHIP BETWEEN EVENTS AND THREE-LEVEL AUTOMATA

| Level | Automata | Event |
|---|---|---|
| 0 | Station state | Station state |
| 1 | Non-atomic | Auth. |
| | | Assoc. |
| | | Re-assoc. |
| | | Active Scan |
| 2 | Broadcast | Broadcast Data |
| | | Broadcast Probe Req. |
| | | Beacon |
| | | Interference |
| | Directed MSDU/MMPDU | Unicast Data |
| | | Unicast Probe Req./Probe Rsp. |
| | | Auth. Req./Auth. Rsp. |
| | | Assoc. Req./Assoc. Rsp. |
| | | Re-assoc. Req./Re-assoc .Rsp. |
| | | De-auth. |
| | | Disassoc. |
| | Immediate PS-poll Rsp. | Immediate PS-poll |
| | Deferred PS-poll Rsp. | Deferred PS-poll |

When the reproduce module 300 reproduces the captured packets from the first traffic capture module 100, the corresponding environment effects should also be generated. Because the real environment affects the error probability of each packet, each reproduce packet and the environment effect it suffers should be synchronized. Thus, the reproduce module 300 synchronizes the reproduced packets and environment effects by the level-2 automata. Since the transitions of the level-2 automata are triggered by packet exchanges, the reproduce module 300 adjusts the environment factors at each state transition.

In wireless communications, several environment factors, such as fading, noise, and interference, may increase the bit error rate. Fading represents that the signal strength of transmitted packets decreases due to path loss or shadowing. Noise is a random disturbance signal that cannot be recognized by the wireless communication system. Interference is originated by other devices that intend to access the shared medium in the same wireless communication system. To emulate the key environment factors, the reproduce module 300 uses an attenuator to adjust the signal strength according to RSSI, and a vector signal generator to generate the noise by AWGN according to the record noise strength. Because the packets collided with each other would be considered as noise, the reproduce module 300 emulate the interference by reproducing only the captured packets that are irrelative to the DUT without packet-replay control. That is, interference is treated as a special event controlled by the Broadcast automaton.

Figure 6:
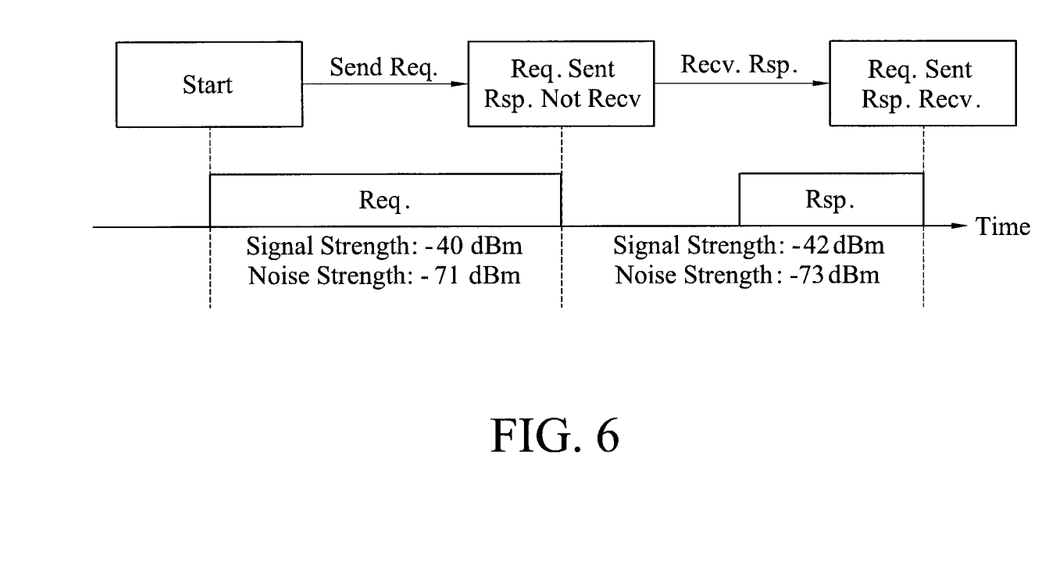
FIG. 6 is a block diagram of an example of synchronizing the environment effects.

Here illustrates an example of synchronizing the environment effects with the packet-replay control in FIG. 6.

Refer to FIG. 6. When the system intends to transmit the Req. to the DUT, the signal and noise strength is set to −40 and −71 dBm, respectively. After sending the Req., the reproduce module 300 immediately sets the signal and noise strength to −42 and −73 dBm, respectively, until the DUT replies the Rsp.

Figure 7:
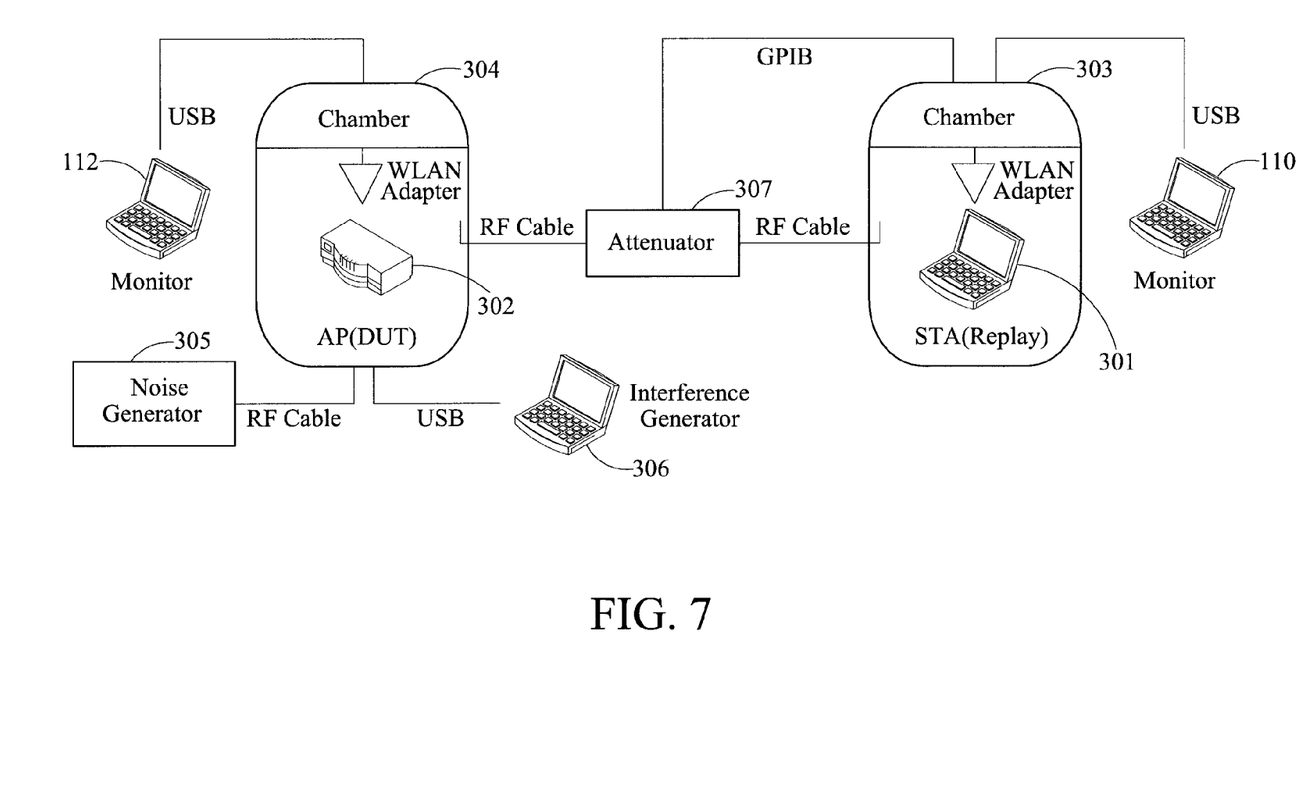
FIG. 7 is a block diagram of evaluation testbed according to an embodiment of the present invention.

The experiments as FIG. 7 illustrated examine the packet-replay control and environment emulation separately. Moreover, a case study is provided to observe the relationships of reproduction ratios and upper-layer cases.

The testbed consists of two chambers 303 and 304 to separate the uncontrollable open environment. An AP 302 plays the role of the DUT and an STA 301 plays the role of the replay are put in the chambers, respectively. To capture the traffic at both the transmitter and receiver sides, two monitors 110 and 112 capture the packets and environment effects by the WLAN adapters through the USB interface. For environment emulation, an attenuator 307 that adjusts the signal strength connects to both of the chambers 303 and 304 through RF cables. At the DUT side, a noise generator 305 and an interference generator 306 generate the noise and interference, respectively. We put all the devices at the fixed positions and calibrate them carefully before the experiments.

After evaluating the reproduction ratio, the following experiments intend to investigate the relationships between the link-layer events and the upper-layer cases. Table 2 summarizes the experimental results.

TABLE 2

CASE STUDY OF UPPER-LAYER CASES

| | Link association | ICMP (Ping) | UDP (TFTP) in dirty env. | | UDP (TFTP) in clean env. | | TCP (Telnet) |
|---|---|---|---|---|---|---|---|
| | | | BMP file | MP3 file | BMP file | MP3 file | |
| Reproduction ratio | 100% | 99.42% | 98.08% | 99.70% | 99.89% | 99.14% | 58.11% |
| Test case succ. ratio | 100% | 86.99% | 0% (13.3% Transmitted) | 0% (0.96% Transmitted) | 99.87% | 82.23% | 0% (12% Transmitted) |

These experiments investigate the network-layer (ICMP) and transport-layer (UDP and TCP) cases, and compare the results with the reproduction ratios of the link layer. For the link layer, because the link-layer behaviors can be handled by the reproduced module 300 immediately, the reproduction ratio is consistent with the success ratio of link association. For the ICMP, the reproduction ratio is slightly higher than the number of successful Ping because a portion of Ping fails in the real environment due to the corrupted Ping Responses from the DUT.

For the UDP, the experiment intends to send a BMP file (300 KB) and a MP3 file (2 MB) by the TFTP. The reproduction ratio is near 100% but no file can be successfully sent. The reason is that the captured traffic in the real environment is incomplete. A portion of packets might be lost. When the system reproduces the TFTP packets with a gap of sequence number, the TFTP server requests the TFTP client to retransmit the lost packet and does not merge the contents of the following packets. Another experiment operates in a clean environment and all the packets are captured correctly. In this case, most of the reproduced TFTP transmissions are complete. Therefore, defects of capture highly affect the effectiveness of traffic replay.

For the TCP, the Telnet connection establishment is applied in this experiment. The result shows the low reproduction ratio and no successful Telnet connection establishment. A TCP connection establishment requires the three-way handshake to negotiate the ACK and sequence numbers. However, the reproduced ACK and sequence numbers are inconsistent in the new negotiation. The TCP connection cannot be established and the following packets would also be rejected. Thus, the subsequent events fail due to the Telnet server does not generate the subsequent packets appeared in the real environment. As a result, upper-layer protocols may degrade reproduction ratios because the actions of the DUT may be determined by upper-layer protocols.

Therefore, the contents of a packet have to be adjusted according to the variations of the upper layers, or the upper layer protocols will not be established successfully and the replay result is affected. Thus, the reproduce module 300 may replay the sequence of events from the first event transform module 200 and the environment effects from the first traffic capture module 100 according to the variations of the upper layer (e.g., a network layer, a transport layer, and an application layer) protocols. Table 3 lists parameters affecting the upper layer protocols. The parameters are determined according to the protocols. In other words, different protocols adopt different parameters according to their specification definitions.

Table 3 takes TCP as an example, in which Destination IP Address, Source IP Address, Destination Port Number, Source Port Number, Sequence Number, Ack. Number, Checksum, Window Size and the like are employed. It is known that the parameters may affect whether the upper layer protocols can be established successfully. Table 3 lists examples for the attributes. The attributes are defined according to test conditions and environment, and can be modified statically or dynamically. The attributes include a static modification and a dynamic modification. The static modification indicates that the parameters are determined before replaying process (the replying process means that the reproduce module replays the sequence of events from the first event transform module and the environment effects from the first traffic capture module), and can be processed in an early stage, which is recommended. On the contrary, the dynamic modification indicates that values or contents have to be changed in time in response to any change of the upper layer protocols during the replaying process, which introduces overloads additionally.

TABLE 3 parameters affecting the upper layer protocols and attributes changing the parameters

| | |
|---|---|
| parameter (variable) | Destination IP Address, Source IP Address, Destination Port Number, Source Port Number, Sequence Number, Ack. Number, , Checksum, Windows Size, etc. |
| attribute (attribute) | Static Modification, Dynamic Modification, Dynamic Response, etc. |

Taking TCP protocol as an example, three attributes that the parameters may have are Static Modification, Dynamic Modification, and Dynamic Response. The Static Modification attribute that indicates the corresponding information can be aware in packet traces. The corresponding information can be corrected by parsing the packet trace and modifying according to the configuration of the test bed. Destination IP Address, Source IP Address, Destination Port Number, and Source Port Number belong to this category. The Dynamic Modification attribute that indicates the corresponding information cannot be aware in packet traces. The corresponding information needs to be modified according to the response from the DUT. Sequence Number, Ack. Number, and Checksum belong to this category. When the Initial Send Sequence is originated by the DUT, A reproduce module should replay a Sequence Number equal to the Initial Send Sequence plus one. The Dynamic Response attribute indicates that the corresponding information should be issued according to the grant of the DUT. Window Size belongs to this category. A reproduce module should be aware of whether the size of the next packet satisfies the limitation of Window Size.

This invention provides a real traffic replay solution with environment emulation to reproduce traffic behaviors of IEEE 802.11 in the real environment. The present invention defines a series of events following the IEEE 802.11 protocol. The present invention uses the three-level automata to achieve the packet-replay control and synchronizes the environment effect with each packet. A performance metric called production ratio is defined to quantify the result of traffic replay. The packet traces in the real environment and traffic replay environment are transformed into Ereal and Ereplay, respectively. Finally, calculates the reproduction ratio.

What is claimed is:

1. A system for real traffic replay in wireless networks, comprising:
    a first traffic capture module configured to capture packet traces and environment effects in a real environment and export the packet traces and the environment effects, wherein the first traffic capture module includes a plurality of monitors deposed in the real environment to record the packet traces;
    a first event transform module configured to receive the packet traces from the first traffic capture module, transform the packet traces into a sequence of events, and export the sequence of events;
    a reproduce module configured to receive the environment effects from the first traffic capture module and the sequence of events from the first event transform module so as to control a replay of the environment effects in the real environment with the sequence of events coordinately by means of automata; and
    a ratio calculation module configured to receive the sequence of events from the first event transform module and compare the sequence of events and a sequence of replayed events so as to calculate a reproduction ratio.

2. The system as recited in claim 1, further comprising:
a second traffic capture module configured to capture a replayed packet traces from the reproduce module in a traffic replay environment and export the replayed packet traces; and
a second event transform module configured to receive the replayed packet traces from the second traffic capture module, transform the replayed packet traces into the sequence of replayed events, and export the sequence of replayed events.

3. The system as recited in claim 2, further comprising a benchmarking module configured to provide the sequence of replayed events from the second event transform module for different devices under test to benchmark the performance of the different devices under test.

4. The system as recited in claim 2, wherein the first event transform module transforms the packet traces into the sequence of events following a protocol, and the second event transform module transforms the replayed packet traces into the sequence of replayed events following the protocol.

5. The system as recited in claim 1, wherein the record the packet traces between a station and an access point.

6. The system as recited in claim 5, wherein the station and the access point play the role of a transmitter and a receiver in turn.

7. The system as recited in claim 6, wherein the first traffic capture module determines weights of the plurality of monitors based on signal amplitudes of packet traces recorded by the plurality of monitors, and determines whether the receiver has received the packet traces according to the weights of the plurality of monitors.

8. The system as recited in claim 6, wherein the reproduce module replays the sequence of events transformed by the packet traces captured from the transmitter and by the environment effect captured from the receiver.

9. The system as recited in claim 5, wherein the automat has three levels, the level-0 automaton maintains the station state for the station, the level-1 automaton deals with events that allow an interruption between a request and a response, and the level-2 automaton deals with events that do not allow an interruption between a request and a response.

10. The system as recited in claim 1, wherein the reproduce module classifies the sequence of events by means of the automata prior to controlling the replay.

11. The system as recited in claim 1, wherein the reproduce module replays the sequence of events from the first event transform module and the environment effects from the first traffic capture module according to variations of upper layer protocols.

12. The system as recited in claim 11, wherein the upper layer protocols include a network layer protocol, a transport layer protocol, and an application layer protocol.

13. The system as recited in claim 11, wherein the upper layer protocols are affected by parameters, and the parameters are determined according to the upper layer protocols.

14. The system as recited in claim 13, wherein the parameters have attributes including a static modification.

15. The system as recited in claim 13, wherein the parameters have attributes including a dynamic modification.

16. The system as recited in claim 14, wherein the static modification indicates that the parameters are determined prior to the reproduce module's replaying the sequence of events from the first event transform module and the environment effects from the first traffic capture module.

17. The system as recited in claim 15, wherein the dynamic modification indicates that contents of the attributes have to be changed in time in response to any change of the upper layer protocols while the reproduce module replays the sequence of events from the first event transform module and the environment effects from the first traffic capture module.

* * * * *